United States Patent [19]
Matsuura et al.

[11] Patent Number: 5,351,040
[45] Date of Patent: Sep. 27, 1994

[54] CONTROL SYSTEM FOR CONFIGURING RING LAN WITH IMPROVED RECONFIGURATION OPERATION

[75] Inventors: Fumiaki Matsuura, Hadano; Kazuhiro Ushijima, Kanagawa; Hisashi Matsumura, Odawara; Masahide Kouhei, Miyagi; Tsutomu Koita, Hadano, all of Japan

[73] Assignees: Hitachi, Ltd., Tokyo; Hitachi Software Eng. Co. Ltd., Yokohama; Hitachitelecom Tech. Ltd., Koriyama; Hitachi Computer Eng. Co., Ltd., Hadano, all of Japan

[21] Appl. No.: 755,118

[22] Filed: Sep. 5, 1991

[30] Foreign Application Priority Data

Sep. 5, 1990 [JP] Japan ................................. 2-233136

[51] Int. Cl.$^5$ ............................................. H04Q 3/00
[52] U.S. Cl. ......................... 340/825.05; 340/825.01; 340/825.16; 370/16.1; 371/5.5; 371/11.2
[58] Field of Search ................. 340/825.05, 825.16, 340/825.01, 827; 371/5.5, 8.2, 11.2, 14; 370/16, 16.1

[56] References Cited

U.S. PATENT DOCUMENTS

| | | | |
|---|---|---|---|
| 4,365,247 | 12/1982 | Bargeton et al. | 340/825.01 |
| 4,598,355 | 7/1986 | Shepler et al. | 371/14 |
| 4,704,714 | 11/1987 | Tomizawa et al. | 370/16 |
| 4,847,610 | 6/1989 | Ozawa et al. | 340/825.16 |
| 5,033,047 | 7/1991 | Uehara | 371/8.2 |
| 5,138,609 | 8/1992 | Hashimoto | 370/16 |

FOREIGN PATENT DOCUMENTS

| | | | |
|---|---|---|---|
| 138693A | 4/1984 | European Pat. Off. | 371/5.5 |
| 57-84646 | 5/1982 | Japan | 371/5.5 |
| 60-187160 | 9/1985 | Japan | 371/5.5 |
| 61-236274 | 10/1986 | Japan | |

*Primary Examiner*—John K. Peng
*Assistant Examiner*—A. Hill
*Attorney, Agent, or Firm*—Antonelli, Terry, Stout & Kraus

[57] ABSTRACT

In a ring LAN system having a configuration control unit serially connected to a dual ring transmission line, the configuration control unit is provided with a transmission line reconfiguration control mechanism to disconnect a fault point upon detection of a transmission fault, such as a breaking of one of a twisted pair of cables, and after recovery of the fault, reconnect the disconnected point to restore the transmission line to its original state. The reconfiguration control mechanism suspends reconfiguration control if a reconfiguration operation counter counts more than a predetermined number of reconfiguration operations within a predetermined time period measured by a reconfiguration operation monitor timer, such as when a temporary fault occurs intermittently. However, operation of such reconfiguration control suspension is initially suspended after system start up, such as when transmission line signals are attenuated and appear as faults, until after an elapsed time after system start up measured by a lapse time timer reaches a preselected time period. Operation of the reconfiguration control mechanism is controlled by a reconfiguration management mechanism.

6 Claims, 2 Drawing Sheets

CONTROL SYSTEM FOR CONFIGURING RING LAN WITH IMPROVED RECONFIGURATION OPERATION

BACKGROUND OF THE INVENTION

The present invention relates to a configuration control unit for controlling the configuration of a ring LAN, and more particularly to a control system for stopping excessive repetition of a reconfiguration function, and is further capable of preventing a reconfiguration function from being suspended at the time of starting up the system.

As a conventional technique regarding a ring LAN system configuration control system, there is known a technique such as described in Japanese Patent Laid-open Publication JP-A-61-236247.

According to this technique, if a fault occurs on a transmission line, the fault point is disconnected on the assumption that such a fault will continue forever. Thus, in the case where a temporary fault occurs intermittently, such as in the case of breaking of one of twisted pair cables, the fault point is temporarily disconnected from the transmission line. This fault is immediately recovered to obtain a normal state so that the recovered fault point is mounted again on the transmission line. In such a case where a temporary fault occurs intermittently, the above-described conventional technique encounters a problem in that the operations of disconnecting fault points and mounting the recovered fault points on the transmission line must be repeated (hereinafter called "oscillation of reconfiguration function").

SUMMARY OF THE INVENTION

In order to solve the problem of the conventional technique, it can be considered that a reconfiguration control mechanism is provided within a configuration control unit so that this mechanism monitors the transmission line, and if a reconfiguration operation is repeated more than a predetermined number of times within a predetermined time period, the reconfiguration function is suspended.

It is therefore possible to prevent an oscillation of reconfiguration function caused by faults on a transmission line such as breaking one of twisted pair cables, thereby improving the reliability of the system.

If the number of communication terminals connected to a token ring LAN system is small, the distance between communication terminals becomes longer than a rated value in some cases such as at the time of starting up the system. Therefore, a signal on the transmission line is attenuated. This attenuated signal is like a signal which is generated upon occurrence of a fault of breaking one of a twisted pair cables. In such a case, the above-described configuration control unit repeats the reconfiguration operation more than a predetermined number of times within a predetermined time period so that the reconfiguration function is suspended.

The above-described reconfiguration control technique does not consider such a case. Namely, the length of a transmission line temporarily becomes longer than a rated value at the time of starting up the system, so that a signal on the transmission line is attenuated and becomes like a signal which is generated upon occurrence of a fault of breaking one of a twisted pair cables. Thus, there arises a problem that the configuration control unit suspends the reconfiguration function at the time of starting up the system, thereby lowering the reliability of the whole system.

It is therefore an object of the present invention to provide a ring LAN configuration control system capable of preventing a configuration control unit from suspending the reconfiguration function at the time of starting up the system, and improving the reliability of the system.

According to the present invention, the above object is achieved by suspending, during a preselected time period after starting up the reconfiguration unit, a function that suspends the reconfiguration function when the reconfiguration operation is performed more than a predetermined number of times a predetermined time. Specifically, the above object is achieved by providing a reconfiguration control mechanism within the configuration control unit, checking a lapse time after starting up the configuration control unit after the mechanism performs a reconfiguration operation, counting the number of reconfiguration operations only when the lapse time is equal to or longer than a preselected amount of time, and performing a corresponding operation (suspending the reconfiguration function if the reconfiguration operation is repeated more than a predetermined number of times within a predetermined time period).

The reconfiguration control mechanism provided within the configuration control apparatus has a function to monitor the state of a transmission line, in accordance with the state of the transmission line, to perform the operations for ring-back and spur disconnection, as well as releasing ring-back and spur disconnection, and to compare a lapse time after starting up the reconfiguration control unit with a preselected time. The reconfiguration control mechanism counts the number of reconfiguration operations only when the lapsed time is equal to or longer than a preselected amount of time, and if the reconfiguration operation is repeated more than a predetermined number of times within a predetermined time period, the reconfiguration function is suspended.

As described above, according to the present invention, it is possible for the configuration control unit to suspend the reconfiguration function at the time of starting up the system, improving the reliability of the system.

DESCRIPTION OF THE PREFERRED EMBODIMENTS

An embodiment of a reconfiguration function stop control system of a configuration control unit according to the present invention will be described with reference to the accompanying drawings.

Figure 1:
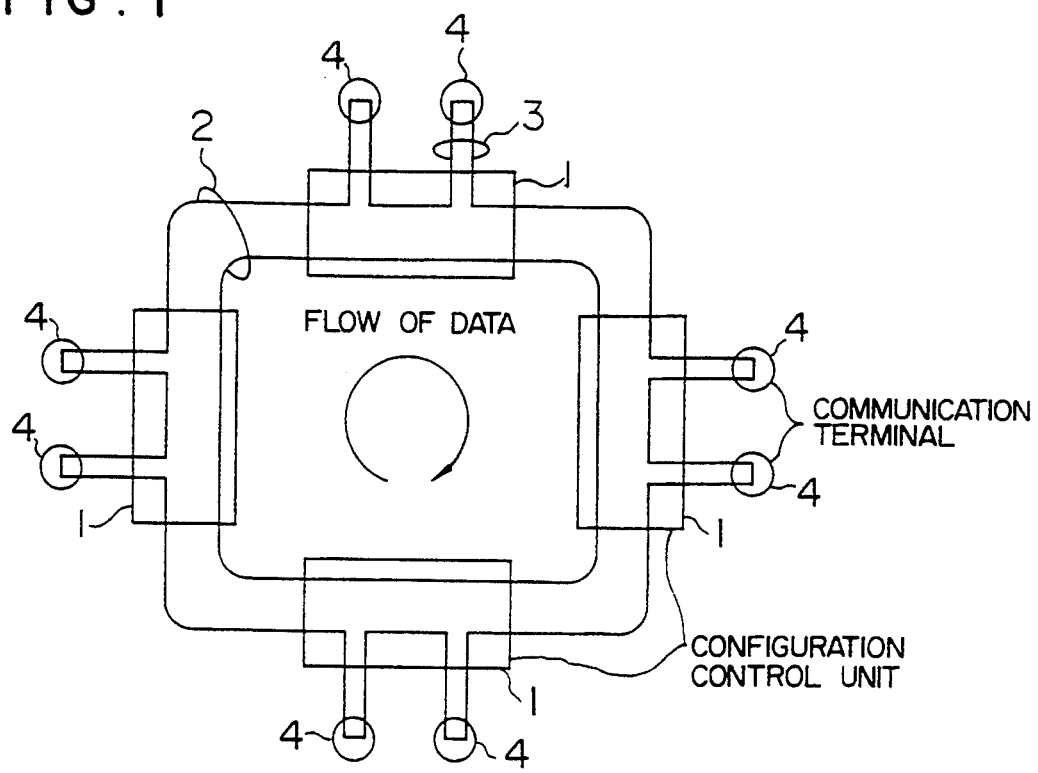
FIG. 1 is a block diagram showing the system arrangement of an embodiment according to the present invention.

A token ring LAN is shown in FIG. 1 by way of example as an embodiment system of the present invention. This system is constructed of a plurality of configuration control units 1 connected to each other by a ring transmission line 2 constituted by two sets of twisted pairs of cables. Each configuration control unit 1 manages a plurality of communication terminals 4 via spurs 3 constituted by twisted pair cables.

The configuration control unit 1 has a function to perform the operations for ring-back or spur 3 disconnection (hereinafter called spur bypass) when a fault occurs on the ring transmission line 2, to thereby remove the fault point and continue communications between communication terminals 4, and a further function to release ring-back or spur bypass (hereinafter called joining).

Figure 2:
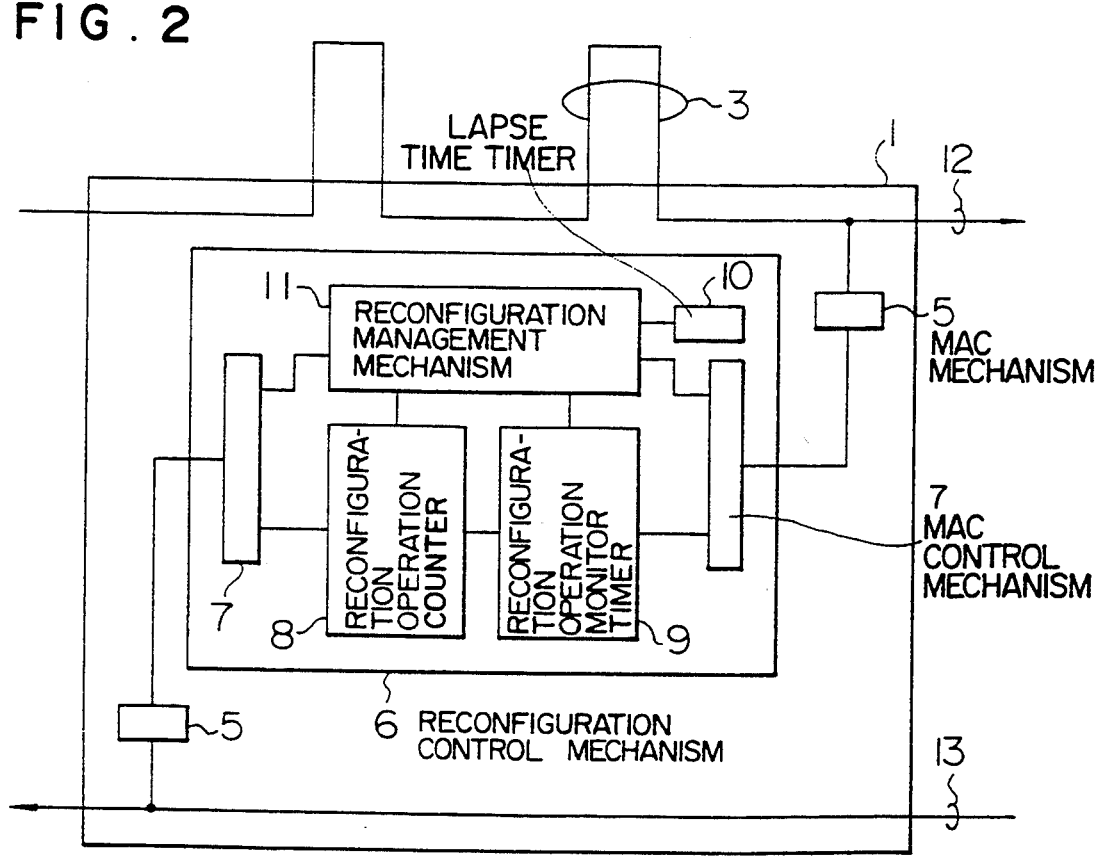
FIG. 2 is a block diagram showing the structure of a configuration control unit.

The configuration control unit 1 with such functions is constructed as shown in FIG. 2.

Referring to FIG. 2, a MAC mechanism 5 has a function to transmit/receive a specific frame called a beacon (BCN) in conformity with IEEE 802.5 and to detect a data transmission right frame (hereinafter called a token). A reconfiguration control mechanism 6 has a function to perform the ring-back, spur bypass, or joining operations.

This reconfiguration control mechanism 6 is constructed of the following units including: a MAC control mechanism 7 for controlling the MAC mechanism 5; a reconfiguration operation counter 8 for counting the number of reconfiguration operations, a reconfiguration operation monitor timer 9 used for monitoring the reconfiguration operation for a predetermined time period; a lapsed time timer 10 for measuring a lapse time after starting up the configuration control unit 1, and a reconfiguration management mechanism 11 for managing those units 7, 8, 9, and 10.

The transmission line connected to the configuration unit 1 constructed as above is constituted by a primary ring 12 under operation and a secondary ring 13 for reservation. The MAC mechanism 5 is connected to both the rings 12 and 13.

The operation of executing a reconfiguration by the reconfiguration management mechanism 11 will be described with reference to FIG. 3.

Figure 3:
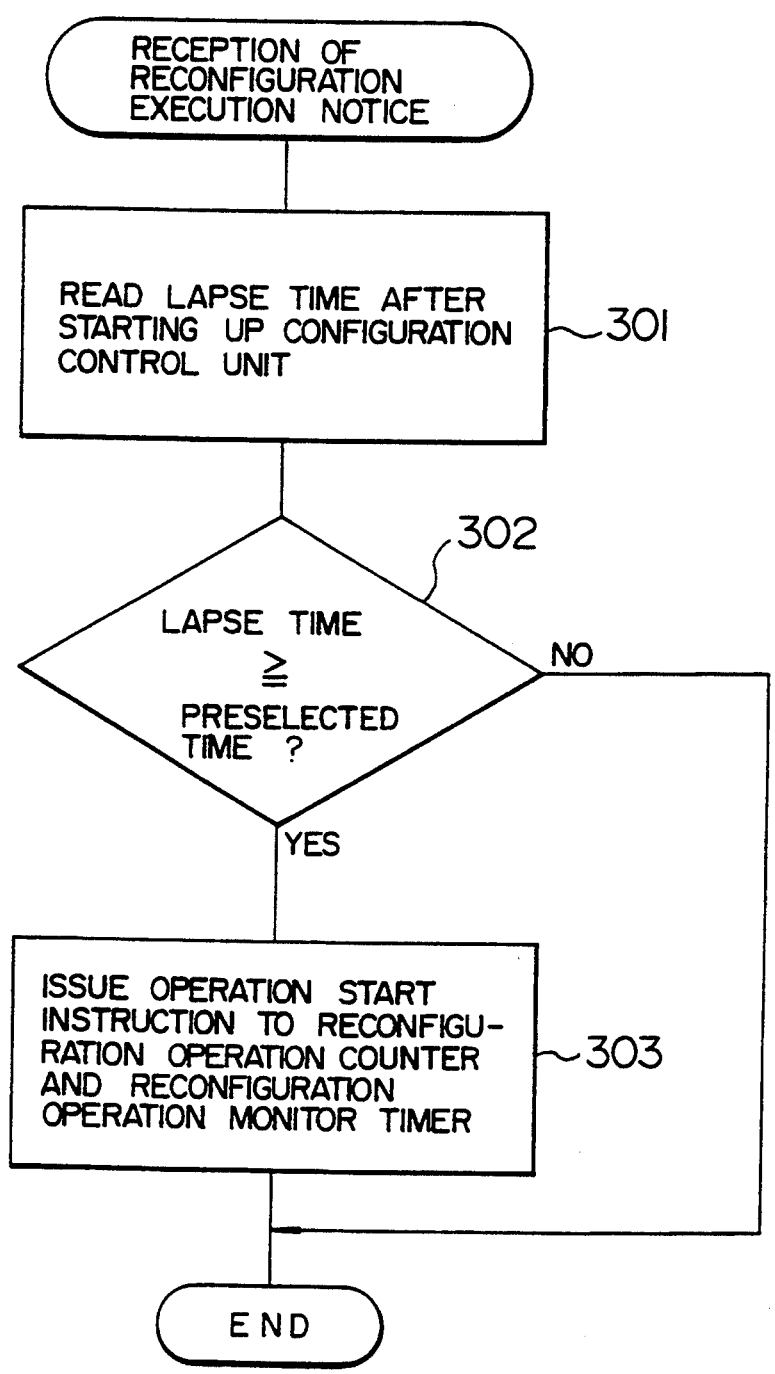
FIG. 3 is a flow chart illustrating the operation of the configuration control unit.

Upon reception of a reconfiguration execution instruction from the MAC control mechanism 7, the reconfiguration management mechanism 11 starts operating in the manner illustrated in the flow chart of FIG. 3.

(1) First, an inquiry is sent to the lapse time timer 10 as to the lapsed time after starting up the configuration control unit 1, and the lapsed time from the lapse time timer 10 is received (step 301).

(2) The reconfiguration management mechanism 11 then compares the lapsed time with a preselected time period (step 302).

(3) If the comparison at step 302 indicates that the lapsed time is equal to or longer than a preselected time, the reconfiguration operation counter 8 and reconfiguration operation monitor timer 9 are instructed to start their operations (step 303).

Upon reception of an operation start instruction from the reconfiguration management mechanism 11, the reconfiguration operation counter 8 and reconfiguration operation monitor timer 9 start operating. Then, the reconfiguration management mechanism 11 can suspend the reconfiguration function if the reconfiguration operation is repeated more than a predetermined number of times within a predetermined time period.

(4) If the comparison at step 302 indicates that the lapsed time is shorter than the preselected amount of time, the reconfiguration management mechanism 11 performs no particular operation.

Therefore, the reconfiguration operation counter 8 and reconfiguration operation monitor timer 9 will not start operating, and so the reconfiguration management mechanism 11 will not stop the reconfiguration function.

According to the embodiment of the present invention described above, the reconfiguration management mechanism 11 operates such that a function to suspend the reconfiguration function will not be activated during a preselected time after starting up the configuration control unit 1. Therefore, in a transmission system such as a ring LAN having a dual ring transmission line, it is possible to prevent the configuration control unit from suspending the reconfiguration function when the length of the transmission line temporarily exceeds a rated value at the time of starting the system, thereby improving the reliability of the transmission system.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements include with the spirit and scope of the claims.

We claim:

1. In a control system for controlling a reconfiguration function of a configuration control unit serially connected to a dual ring transmission line of a ring LAN system, said configuration control unit comprises:
    transmission line reconfiguration means for disconnecting a fault point upon detection of a fault occurring on the transmission line and, after recovery of said fault, reconnecting the disconnected point;
    reconfiguration suspension means for suspending operation of said transmission line reconfiguration means if operation of said transmission line reconfiguration means is performed more than a predetermined number of times within a predetermined time period; and
    start up suspension means for suspending operation of said reconfiguration suspension means during a preselected time period after starting up said configuration control unit.

2. In a ring LAN system having a configuration control unit serially connected to a dual ring transmission line, said configuration control unit comprises:
    transmission line reconfiguration means for disconnecting a fault point upon detection of a fault occurring on the transmission line and, after recovery of said fault, reconnecting the disconnected point;
    reconfiguration suspension means for suspending operation of said transmission line reconfiguration means if operation of said transmission line reconfiguration means is performed more than a predetermined number of times within a predetermined time period; and
    start up suspension means for suspending operation of said reconfiguration suspension means during a preselected time period after starting up said configuration control unit.

3. A configuration control unit serially connected to a dual ring transmission line of a ring LAN system, said configuration control unit comprising:
    transmission line reconfiguration means for disconnecting a fault point upon detection of a fault occurring on the transmission line and, after recovery of said fault, reconnecting the disconnected point;

reconfiguration function suspending means for suspending operation of said transmission line reconfiguration means if operation of said transmission line reconfiguration means is performed more than a predetermined number of times within a predetermined time period; and start up suspension means for suspending operation of said reconfiguration function suspending means during a preselected time period after starting up said configuration control unit.

4. A control system for controlling a configuration of a ring LAN system, said control system comprising:

a dual ring transmission line; and a configuration control unit serially connected to said dual ring transmission line, said configuration control unit comprising:

transmission line reconfiguration means for disconnecting a fault point upon detection of a transmission fault occurring on said transmission line and, after recovering said fault, reconnecting said disconnected point, reconfiguration suspension operation of means for suspending said transmission line reconfiguration means if operation of said transmission line reconfiguration means is performed more than a predetermined number of times within a predetermined time period, and start up suspension operation of means for suspending said reconfiguration suspension means during a preselected time period after starting up said configuration control unit.

5. A ring LAN system having a configuration control unit for system reconfiguration operation, said ring LAN system comprising:

a dual ring transmission line; and a configuration control unit serially connected to said dual ring transmission line, said configuration control unit comprising:

transmission line reconfiguration means for disconnecting a fault point upon detection of a transmission fault occurring on said transmission line and, after recovering said fault, reconnecting the disconnected point, reconfiguration suspension means for suspending operation of said transmission line reconfiguration means if operation of said transmission line reconfiguration means is performed more than a predetermined number of times within a predetermined time period, and start up suspension means for suspending operation of said reconfiguration suspension means during a preselected time period after starting up said configuration control unit.

6. A method for controlling a configuration control unit serially connected to a dual ring transmission line in a ring LAN system, said method comprising the steps of:

detecting a point of transmission fault occurring along said transmission line;

disconnecting said point from said transmission line;

reconnecting said point to said transmission line after recovering said transmission fault;

suspending said disconnecting and reconnecting steps if said disconnecting and reconnecting steps are performed more than a predetermined number of times within a predetermined time period; and suspending said suspending step during a preselected time period after starting up said configuration control unit.

* * * * *